(12) United States Patent
Kawi et al.

(10) Patent No.: US 11,008,524 B2
(45) Date of Patent: May 18, 2021

(54) CATALYTIC MEMBRANE SYSTEM FOR CONVERTING BIOMASS TO HYDROGEN

(71) Applicant: National University of Singapore, Singapore (SG)

(72) Inventors: Sibudjing Kawi, Singapore (SG); Kus Hidajat, Singapore (SG); Usman Oemar, Singapore (SG); Ashok Jangam, Singapore (SG); Ming Li Ang, Singapore (SG); Yasotha Kathiraser, Singapore (SG); Zhigang Wang, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 15/509,734

(22) PCT Filed: Feb. 27, 2015

(86) PCT No.: PCT/SG2015/000059
§ 371 (c)(1),
(2) Date: Mar. 8, 2017

(87) PCT Pub. No.: WO2016/053182
PCT Pub. Date: Apr. 7, 2016

(65) Prior Publication Data
US 2017/0283721 A1    Oct. 5, 2017

Related U.S. Application Data

(60) Provisional application No. 62/057,439, filed on Sep. 30, 2014.

(51) Int. Cl.
*C10J 3/82*    (2006.01)
*B01D 71/02*    (2006.01)
(Continued)

(52) U.S. Cl.
CPC .............. *C10J 3/82* (2013.01); *B01D 53/228* (2013.01); *B01D 63/02* (2013.01); *B01D 71/022* (2013.01);
(Continued)

(58) Field of Classification Search
CPC ...... Y02P 20/52; Y02P 20/584; Y02P 20/145; C10K 1/34; C10K 3/023; C10K 3/006;
(Continued)

(56) References Cited

U.S. PATENT DOCUMENTS 4,217,295 A * 8/1980 Friedrich ................. B01J 21/16
502/84
8,349,280 B2 1/2013 Baek et al.
(Continued)

FOREIGN PATENT DOCUMENTS

| CN | 103484163 A | 1/2014 |
|---|---|---|
| WO | WO-2007/092844 A2 | 8/2007 |
| WO | WO-2010/019319 A2 | 2/2010 |

OTHER PUBLICATIONS

Wang et al. High performance oxygen permeable membrane . . . Journal of MembraneScience431(2013)180-186.*
(Continued)

*Primary Examiner* — Anthony J Zimmer
*Assistant Examiner* — Syed T Iqbal
(74) *Attorney, Agent, or Firm* — Cesari & McKenna, LLP

(57) ABSTRACT

A two-reactor catalytic system including a catalytic membrane gasification reactor and a catalytic membrane water gas shift reactor. The catalytic system, for converting biomass to hydrogen gas, features a novel gasification reactor containing both hollow fiber membranes that selectively allow $O_2$ to permeate therethrough and a catalyst that facilitates tar reformation. Also disclosed is a process of converting biomass to H2. The process includes the steps of, among
(Continued)

others, introducing air into a hollow fiber membrane; mixing the $O_2$ permeating through the hollow fiber membrane and steam to react with biomass to produce syngas and tar; and reforming the tar in the presence of a catalyst to produce more syngas.

7 Claims, 1 Drawing Sheet

(51) Int. Cl.
| | |
|---|---|
| B01D 53/22 | (2006.01) |
| C10K 3/00 | (2006.01) |
| C01B 3/16 | (2006.01) |
| B01J 37/18 | (2006.01) |
| B01J 23/755 | (2006.01) |
| B01J 23/83 | (2006.01) |
| B01J 35/06 | (2006.01) |
| B01J 37/02 | (2006.01) |
| B01D 63/02 | (2006.01) |
| B01J 8/00 | (2006.01) |
| B01J 8/04 | (2006.01) |
| C10L 5/00 | (2006.01) |
| B01J 21/16 | (2006.01) |
| B01J 23/00 | (2006.01) |
| B01J 29/03 | (2006.01) |
| C10J 3/02 | (2006.01) |
| C10K 1/34 | (2006.01) |
| B01J 37/08 | (2006.01) |
| C10J 3/72 | (2006.01) |
| C10K 3/04 | (2006.01) |

(52) U.S. Cl.
CPC ......... *B01D 71/024* (2013.01); *B01D 71/025* (2013.01); *B01J 8/009* (2013.01); *B01J 8/04* (2013.01); *B01J 8/0442* (2013.01); *B01J 8/0457* (2013.01); *B01J 8/0492* (2013.01); *B01J 21/16* (2013.01); *B01J 23/002* (2013.01); *B01J 23/755* (2013.01); *B01J 23/83* (2013.01); *B01J 29/0333* (2013.01); *B01J 35/065* (2013.01); *B01J 37/0203* (2013.01); *B01J 37/0236* (2013.01); *B01J 37/08* (2013.01); *B01J 37/18* (2013.01); *C01B 3/16* (2013.01); *C10J 3/02* (2013.01); *C10J 3/721* (2013.01); *C10K 1/34* (2013.01); *C10K 3/003* (2013.01); *C10K 3/04* (2013.01); *C10L 5/00* (2013.01); *B01D 2053/224* (2013.01); *B01D 2256/12* (2013.01); *B01D 2257/102* (2013.01); *B01D 2258/06* (2013.01); *B01D 2313/42* (2013.01); *B01D 2317/08* (2013.01); *B01D 2325/04* (2013.01); *B01J 35/06* (2013.01); *B01J 2208/00911* (2013.01); *B01J 2523/00* (2013.01); *C01B 2203/0283* (2013.01); *C01B 2203/0405* (2013.01); *C10J 2200/06* (2013.01); *C10J 2200/15* (2013.01); *C10J 2300/0913* (2013.01); *C10J 2300/0916* (2013.01); *C10J 2300/0959* (2013.01); *C10J 2300/0976* (2013.01); *Y02C 20/40* (2020.08); *Y02E 50/30* (2013.01); *Y02P 20/145* (2015.11); *Y02P 20/52* (2015.11)

(58) Field of Classification Search
CPC .. C10K 3/04; C10K 3/003; C01B 2203/1058; C01B 2203/0415; C01B 2203/1094; C01B 2203/0227; C01B 3/40; C01B 2203/0877; C01B 2203/0465; C01B 2203/1082; C01B 3/16; C01B 2203/0283; C01B 2203/0405; B01J 2523/00; B01J 23/83; B01J 23/94; B01J 37/03; B01J 23/002; B01J 37/0236; B01J 37/08; B01J 37/18; B01J 23/755; B01J 35/065; B01J 37/0203; B01J 35/06; B01J 2208/00911; B01J 8/009; B01J 8/0457; B01J 8/0492; B01J 8/0442; B01J 8/04; B01J 21/16; B01J 29/0333; C10J 2300/093; C10J 3/005; C10J 2300/0916; C10J 3/82; C10J 3/721; C10J 2200/06; C10J 2200/15; C10J 2300/0913; C10J 2300/0959; C10J 2300/0976; C10J 3/02; C10L 5/00; B01D 53/228; B01D 71/022; B01D 63/02; B01D 2317/08; B01D 2258/06; B01D 2257/102; B01D 2256/12; B01D 2313/42; B01D 2325/04; B01D 2053/224; B01D 71/024; B01D 71/025; Y02C 20/40; Y02E 50/30
See application file for complete search history.

(56) References Cited

U.S. PATENT DOCUMENTS

| | | | |
|---|---|---|---|
| 2004/0129135 A1 | 7/2004 | Roark et al. | |
| 2008/0169449 A1 | 7/2008 | Mundschau | |
| 2012/0058030 A1* | 3/2012 | Suzuki | B01J 23/002 423/210 |
| 2012/0067211 A1* | 3/2012 | Tessier | B01D 53/228 95/55 |
| 2012/0134888 A1 | 5/2012 | Blevins et al. | |
| 2013/0071594 A1* | 3/2013 | Bikson | F28D 15/00 428/36.9 |
| 2013/0131199 A1 | 5/2013 | Lien et al. | |
| 2015/0073188 A1* | 3/2015 | Floudas | C07C 5/2767 585/332 |

OTHER PUBLICATIONS

Maneerung et al. "Ultra-thin (<1 m) internally-coated Pd—Ag alloy . . . " Journal of Membrane Science 452 (2014) 127-142.*
Li et al. "Low-temperature water-gas shift reaction . . . " Applied Catalysis B: Environmental 27 (2000) 179-191.*
Liu et al. "Promotion effect of cerium and lanthanum oxides on Ni/SBA-15 . . . ". Catalysis Today 131 (2008) 444-449.*
First Office Action issued in Chinese Application No. 201580052572.7 dated Jun. 5, 2019.

* cited by examiner

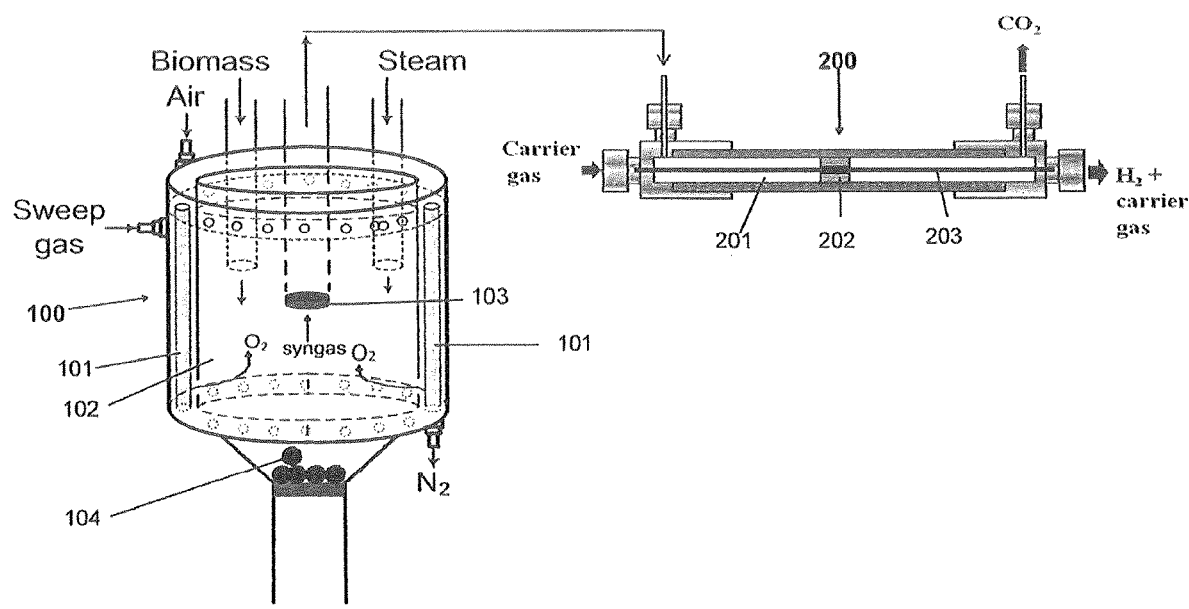

CATALYTIC MEMBRANE SYSTEM FOR CONVERTING BIOMASS TO HYDROGEN

CROSS REFERENCE TO RELATED APPLICATIONS

This application is the National Stage of International Application No. PCT/SG2015/000059, filed on Feb. 27, 2015, which claims the benefit of U.S. Provisional Application No. 62/057,439, filed on Sep. 30, 2014. The contents of both applications are hereby incorporated by reference in their entirety.

BACKGROUND OF THE INVENTION

Conversion of biomass to hydrogen has attracted great attention given the potential of using abundant biomass to generate clean power.

The conversion process includes two steps, namely, (i) gasification of biomass to generate syngas, and (ii) water gas shift (WGS), i.e., transformation of steam and syngas to hydrogen.

Conventional biomass gasification requires a large reactor to accommodate a large volume of air as the content of oxygen in the air for the reaction is low. Moreover, tar produced in the gasification step is routinely removed from the reactor instead of being further to processed to generate more syngas. Additionally, before performing the WGS step, some tar impurities remaining in the syngas are typically eliminated at a high temperature, an energy-consuming operation.

There is a need to develop a high-yield method for converting biomass to hydrogen that utilizes compact reactor and minimal energy.

SUMMARY OF THE INVENTION

The present invention relates to a catalytic membrane system that converts biomass to $H_2$ gas in an unexpectedly cost-effective and productive manner.

In one aspect, this invention is a process of converting biomass to $H_2$, as well as $CO_2$. The process includes the steps of: (1) introducing air into a hollow fiber membrane that selectively allows $O_2$, not $N_2$, to permeate therethrough; (2) mixing steam and the $O_2$ that permeates through the hollow fiber membrane to react with biomass to produce syngas, tar, and solid ash; (3) reforming the tar in the presence of a first catalyst to produce more syngas; (4) mixing the syngas and steam to react in the presence of a second catalyst to generate $H_2$ and $CO_2$; and (5) allowing the $H_2$ to selectively permeate through a hollow metal-based membrane, thereby separating the $H_2$ from the $CO_2$ thus produced.

Step (1) of this process is typically performed at 650° C. to 900° C. to maximize permeation of $O_2$ through the hollow fiber membrane.

The above-described process can be conducted in a two-reactor catalytic system containing a catalytic membrane gasification reactor and a catalytic membrane WGS reactor, which is another aspect of the present invention. The two reactors in this invention convert biomass to hydrogen gas in series.

The gasification reactor includes one or more hollow fiber membranes for receiving air, one or more first containers for gasification reaction, and a first catalyst confined in the one or more first containers, the one or more hollow fiber membranes selectively allowing $O_2$, not $N_2$, to permeate therethrough and the first catalyst capable of facilitating a reaction between tar and steam.

The WGS reactor includes one or more second containers, a second catalyst confined in the one or more second containers, and one or more hollow metal-based membranes, the second catalyst capable of facilitating a reaction between syngas and steam and the one or more hollow metal-based membranes selectively allowing $H_2$, but not $CO_2$, to permeate therethrough.

The gasification reactor is connected in fluid communication with the one or more second containers.

Upon introduction of both air, through the one or more hollow fiber membranes, and steam, directly, to the gasification reactor, biomass placed in the gasification reactor reacts with steam and the $O_2$ permeating through the one or more hollow fiber membranes to produce tar and a syngas containing $H_2$ and CO. The tar thus produced, in the presence of the first catalyst, reacts with the steam to produce more syngas containing $H_2$ and CO. The syngas thus produced is transported to the one or more second containers to react with steam in the presence of the second catalyst to produce $H_2$ and $CO_2$. The $H_2$ thus produced selectively permeates through the one or more hollow metal-based membranes, while the $CO_2$ thus produced remains in the one or more second containers.

An embodiment of the hollow fiber membrane includes $BaBi_{0.05}Co_{0.95-x}Nb_xO_{3-\delta}$ in which $0 \leq x \leq 0.2$ ($\delta$ stands for oxygen vacancy resulting from instability of the membrane structure caused by substitution of Bi and/or Nb). Preferably, the hollow fiber membrane is formed of $BaBi_{0.05}Co_{0.8}Nb_{0.15}O_{3-\delta}$ and has a thickness of 1 to 3 mm.

One embodiment of the hollow metal-based membrane contains a metal such as Pd, Pt, Ni, Ag, Ta, V, Y, Nb, Ce, In, Ho, La, Au, or Ru. Preferably, the hollow metal-based membrane is a palladium alloy composite membrane.

One embodiment of the first catalyst contains one or more of metals Ni, Fe, Co, Cu, La, Ca, Mg, Sr, Al, and Si or oxides thereof, including a combination of a metal(s) and a metal oxide(s). Examples of a nickel-based catalyst include a Ni/phyllosilicate catalyst, a Ni—La/SBA-15 catalyst, a Ni/$Fe_2O_3$—$Al_2O_3$ catalyst, or a Ni/perovskite catalyst. Preferably, the first catalyst is a Ni—La/SBA-15 catalyst having a Ni content of 5-10 wt % and a La content of 0.5-2 wt %.

One embodiment of the second catalyst is a bimetallic nickel-based catalyst including a Ni—Cu/$CeO_2$ catalyst, a Ni—Na/$CeO_2$ catalyst, a Ni—Li/$CeO_2$ catalyst, a Ni—K/$CeO_2$ catalyst, or a Ni—Cu/$SiO_2$ catalyst. Preferably the second catalyst is a Ni—Cu/$CeO_2$ catalyst.

The details of the invention are set forth in the description below. Other features, objects, and advantages of the invention will be apparent from the following drawing and detailed description of several embodiments, and also from the appending claims.

BRIEF DESCRIPTION OF THE DRAWING

FIG. 1 is a schematic depiction of a two-reactor catalytic system of this invention.

DETAILED DESCRIPTION

Within this invention is a two-reactor catalytic system for converting biomass to hydrogen gas, the system-including a catalytic membrane gasification reactor and a catalytic membrane water gas shift reactor. The biomass is a solid waste, e.g., empty fruit bunch, mesocarp fibre, or Palm Kernel Shell. FIG. 1 shows an embodiment of the two-reactor catalytic system. It includes (i) a gasification reactor 100 disposed in which are a number of hollow fiber membranes 101 for receiving air, a container 102, and a catalyst 103 confined in container 102; and (ii) a water gas shift reactor 200 disposed in which are a container 201, a catalyst 202 confined in container 201, and a hollow metal-based $H_2$ membrane 203. The gasification reactor 100 is connected via a pipeline with container 201 in the water gas shift reactor 200.

As shown in FIG. 1, the process of converting biomass to hydrogen gas starts with $O_2$ separation from air through the hollow fiber membranes 101, which are installed in a circle inside the gasification reactor 100 for receiving air. Air is introduced into the gasification reactor 100 and distributed to the hollow fiber membranes 101. The hollow fiber membranes 101 selectively allow $O_2$, not $N_2$, to permeate therethrough. A sweep gas, e.g., Ar or He gas, is also introduced into the gasification reactor 100 to create a pressure gradient across the hollow fiber membranes 101 to facilitate continuous permeation of $O_2$ into container 102. The $N_2$ remaining in the hollow fiber membranes 101 is removed from the gasification reactor 100. Biomass and steam are introduced into container 102 simultaneously to react with the $O_2$ therein.

FIG. 1 also shows that, upon introduction of biomass and steam into the gasification reactor 100, the $O_2$ permeating through the hollow fiber membranes 101 reacts with the biomass and steam to convert the biomass to ash 104, tar (not shown), and syngas containing $H_2$ and CO. The ash 104 collected at the bottom of container 102 can be further utilized in production of cement, brick, and asphalt. Catalyst 103 confined in container 102 facilitates reformation of the tar with steam to produce more syngas. The syngas produced in the gasification reactor 100 is then transported to container 201 disposed in the WGS reactor 200.

Upon entering into container 201 together with steam, the CO in the syngas reacts with the steam in the presence of catalyst 202 confined in container 201 to produce $H_2$ and $CO_2$. A carrier gas, e.g., $N_2$, Ar, or He gas, is introduced into the hollow metal-based $H_2$ membrane 203 to create a pressure gradient inside the membrane 203 to facilitate continuous permeation of the $H_2$ thus produced therethrough and its exit therefrom, resulting in separation of the $H_2$ from the $CO_2$ thus produced. The $CO_2$ remaining in container 201 is subsequently removed from the WGS reactor 200 for collection.

A hollow fiber membrane plays two key roles in biomass gasification: (1) separating $O_2$ from air to supply pure $O_2$ required for optimal gasification; and (2) controlling the amount of $O_2$ flowing into a gasification reactor. As the gasification reactor receives pure $O_2$, its required size is smaller than those not including or connected to a hollow fiber membrane. The amount of oxygen present in the gasification reactor must be well controlled to achieve high reaction efficiency and minimize formation of by-products. An excess amount of oxygen can lead not only to more water and $CO_2$ production but also to formation of undesired nitrogen oxides, e.g., NO and $NO_2$, due to the presence of nitrogen compounds in the biomass. Optimization of the oxygen amount is effected based on both the air flow rate and the $O_2$ permeation efficiency.

Regarding the catalyst for tar reformation, it may contain one or more of metals Ni, Fe, Co, Cu, La, Ca, Mg, Sr, Al, and Si or oxides thereof, including a combination of a metal(s) and a metal oxide(s). Particularly, a nickel-based catalyst containing Fe, Co, Cu, La, Ca, Mg, Sr, Al, or Si can catalyzes the tar reformation. A Li, Na, K, Mg, Ca, or Sr, independently or in combination, greatly improves the catalyst performance. Examples of a nickel-based catalyst include a Ni/phyllosilicate catalyst, a Ni—La/SBA-15 catalyst, a Ni/$Fe_2O_3$—$Al_2O_3$ catalyst, or a Ni/perovskite catalyst. A preferred nickel-based catalyst is a Ni—La/SBA-15 catalyst having a Ni content of 5-10 wt % and a La content of 0.5-2 wt %.

A Ni—La/SBA-15 catalyst combined with hollow fiber membranes unexpectedly improves conversion of toluene (a major component of tar) by >20%, compared with the nickel catalyst only. This nickel-based catalyst also efficiently promotes cellulose (biomass) gasification at 700° C. to increase the contents of $H_2$ and CO in the syngas thus generated. Additionally, use of this nickel catalyst efficiently converts various types of biomass to gaseous products containing $H_2$, CO, $CH_4$, and $CO_2$. The formation rates of these gaseous products increase substantially, compared with gasification without any catalyst.

Referring to the catalyst and the hollow metal-based membrane in a WGS reactor, they in combination effectively promote the WGS reaction resulting in greater production of more hydrogen gas. Co-based catalysts have been traditionally used in the industry for facilitating this reaction. However, the use of Co-based catalyst generally forms methane, at a cost of consuming $H_2$, as a by-product, resulting in a decrease of overall $H_2$ production. Preferably, a bimetallic catalyst, e.g., a Ni—Cu/$CeO_2$ catalyst is utilized in the WGS reaction. Indeed, the Ni—Cu/$CeO_2$ catalyst is robust, stable, and capable of achieving high production of hydrogen gas during the WGS reaction.

Conversion of steam and CO to produce more $H_2$ during the WGS process is also driven by reaction equilibrium. Thus, removal of hydrogen through the hollow metal-based membrane can shift the reaction to promote the CO conversion, hence favourably increasing the $H_2$ production and efficiency of the overall WGS process. Hydrogen permeation rates, in part, depend on the membrane thickness. An ultra-thin layer of a palladium alloy composite membrane serves as a selective membrane with high $H_2$ selectivity and high permeability. In one embodiment, the hollow metal-based membrane contains a metal such as Pd, Pt, Ni, Ag, Ta, V, Y, Nb, Ce, In, Ho, La, Au, or Ru. A palladium alloy composite membrane is preferred.

The $CO_2$ produced in the two-reactor system of this invention can be collected separately. Indeed, this system enables effective separation of $H_2$ and $CO_2$ for separate collections.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever. All publications cited herein are incorporated by reference.

Example 1

A study was conducted to assess the efficiency of a Ni—La/SBA-15 catalyst combined with hollow fiber membranes in biomass gasification as follows.

Each hollow fiber membrane was prepared by calcining $BaBi_{0.05}Co_{0.8}Nb_{0.15}O_{3-\delta}$ (BBCN) perovskite powders at 1050° C. to form pure perovskite structure, which was further fabricated by a phase inversion and sintering technique. See Wang et al., Journal of Membrane Science, 465, 151-158 (2014); and Wang et al., Journal of Membrane Science 431, 180-186 (2013).

Permeation of $O_2$ through the BBCN membrane was demonstrated at 600-900° C., a temperature range desirable for biomass gasification. An $O_2$ permeation flux rate as high as 10 ml cm$^{-2}$ min$^{-1}$ was achieved in this temperature range. At 950° C., the BBCN membrane unexpectedly showed an oxygen flux rate of 14 ml cm$^{-2}$ min$^{-1}$, higher than the highest oxygen flux rate of 11.4 ml cm$^{-2}$ min$^{-1}$ reported in literature for a $BaBi_{0.05}Co_{0.8}Sc_{0.1}O_{3-\delta}$ (BBCS) membrane. See Wang et al., Journal of Membrane Science, 465, 151-158 (2014); and Wang et al., Journal of Membrane Science 431, 180-186 (2013).

A Ni—La/SBA-15 catalyst was prepared by mixing 1.32 g of nickel nitrate hexahydrate and 0.141 g of lanthanum nitrate hexahydrate in 10 mL of de-ionized water, followed by addition of 0.64 g of oleic acid (mol(oleic acid/Ni)=0.5) and 5 g of silica (specific surface area=753 m$^2$/g). The resulting sample was impregnated at 60° C., dried at 100° C., and calcined at 700° C. to form the nickel-based catalyst. See Sibudjing et al., PCT/SG2014/000108.

The efficiency of the Ni—La/SBA-15 catalyst was assessed in gasification of cellulose (biomass) as follows. The Ni—La/SBA-15 catalyst (200 mg) was packed and placed in the gasification reactor shown in FIG. 1 to form a catalytic bed therein. Prior to the reaction, the Ni—La/SBA-15 catalyst was reduced under pure $H_2$ at 700° C. for 1 hour. The cellulose (biomass) was then introduced together with the steam to the reactor to react with the $O_2$ permeating through the BBCN hollow fiber membranes inside the reactor to produce syngas, tar, and ash. The tar thus produced, in the presence of the catalytic bed, reacted with the steam to produce more syngas.

The gasification of cellulose (120 mg/min) was found to result in a $H_2$ formation rate of 4000~4500 μmol/min, a CO formation rate of 2500~3000 μmol/min, a $CO_2$ formation rate of about 1000 μmol/min, and a $CH_4$ formation rate of about 500 μmol/min.

Example 2

A study was conducted in the same manner detailed in Example 1 to compare total gas formation yields in biomass gasification using different catalysts and various types of biomass.

The results set forth below indicate that a Ni—La/SBA-15 catalyst outperformed a Ni—PS—Mg catalyst (see Sibudjing et al., PCT/SG2014/000108) or no catalyst.

The gasification of Palm Kernel Shell (biomass, obtained from Palm Plantation, Malaysia) unexpectedly resulted in a total gas formation rate of about 9000 μmol/min using a Ni—La/SBA-15 catalyst and about 7000 μmol/min using a Ni—PS—Mg catalyst, compared with about 3000 μmol/min without using any catalyst.

The gasification of wood (biomass) unexpectedly resulted in a total gas formation rate of about 9000 μmol/min using a Ni—La/SBA-15 catalyst, compared with about 4000 μmol/min without using any catalyst.

The gasification of cellulose (biomass) resulted in a total gas formation rate of about 9000 μmol/min using a Ni—La/SBA-15 catalyst, compared with about 6000 μmol/min using a Ni—PS—Mg catalyst.

Example 3

In a study detailed below, syngas obtained from biomass gasification was subjected to a WGS reactor to react with steam.

A Ni—Cu/CeO$_2$ catalyst was prepared by mixing nickel nitrate hexahydrate and copper nitrate trishydrate, followed by addition of CeO$_2$. The resulting catalyst was impregnated and calcined. See Saw et al., Journal of Catalysis, 314, 32-46 (2014); and Sibudjing et al., PCT/SG2014/000108.

A palladium alloy hollow membrane was prepared by a phase-inversion method, followed by coating on an inner surface of the membrane with a palladium-silver alloy film. See Sibudjing et al., WO 2013/133771 A1.

An assay was conducted to assess CO conversion rates during the WGS reaction using the Ni—Cu/CeO$_2$ catalyst with and without the palladium alloy hollow membrane as follows. The Ni—Cu/CeO$_2$ catalyst was packed around the palladium alloy hollow membrane. Prior to the reaction, the catalyst was reduced under pure $H_2$ at 600° C. for 1 hour. The syngas obtained from the gasification reactor was then introduced to the WGS reactor, which was maintained at 2 bar using a back pressure regulator. A sweep gas was introduced into the palladium alloy membrane to carry the $H_2$ permeating therethrough out of the WGS reactor.

The CO conversion rate was found to be much higher when the membrane was used with the catalyst, compared with that observed when only the catalyst was used, i.e., 60% vs. 40%.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A process of converting biomass to $H_2$ and $CO_2$, the process comprising:
   step (1): introducing air into hollow fiber membranes that selectively allow $O_2$, not $N_2$, to continuously permeate therethrough, the hollow fiber membranes installed around the perimeter of a circle inside a gasification reactor and controlling the amount of $O_2$ flowing into the gasification reactor;
   step (2): mixing the $O_2$ continuously permeating through the hollow fiber membranes and steam to react with biomass to produce syngas, tar, and ash, wherein the syngas contains $H_2$ and CO;
   step (3): reforming the tar in the presence of a first catalyst to produce more syngas;
   step (4): mixing the syngas produced in step (3) and steam to react in the presence of a second catalyst to generate $H_2$ and $CO_2$; and
   step (5): allowing $H_2$ to selectively permeate through a hollow metal-based membrane, thereby separating the $H_2$ from the $CO_2$.

2. The process of claim 1, wherein the permeation of $H_2$ through the hollow metal-based membrane is conducted at 400° C. to 700° C.

3. The process of claim 1, wherein the permeation of $O_2$ through the hollow fiber membranes is conducted at 650° C. to 900° C.

4. The process of claim 3, wherein the hollow fiber membranes are formed of $BaBi_{0.05}Co_{0.8}Nb_{0.15}O_{3-\delta}$ and has a thickness of 1 to 3 mm.

5. The process of claim 1, wherein the first catalyst is a Ni/phyllosilicate catalyst having a Ni content of 5-45 wt %, a Ni—La/SBA-15 catalyst having a Ni content of 5-10 wt % and a La content of 0.5-2 wt %, a $Ni/Fe_2O_3$—$Al_2O_3$ catalyst, or a Ni/perovskite catalyst.

6. The process of claim 1, wherein the second catalyst is a Ni—$Cu/CeO_2$ catalyst, a Ni—$Na/CeO_2$ catalyst, a Ni—$Li/CeO_2$ catalyst, a Ni—$K/CeO_2$ catalyst, or a Ni—$Cu/SiO_2$ catalyst.

7. The process of claim 2, wherein the hollow metal-based membrane is a palladium alloy composite membrane.

* * * * *